United States Patent Office 3,303,257
Patented Feb. 7, 1967

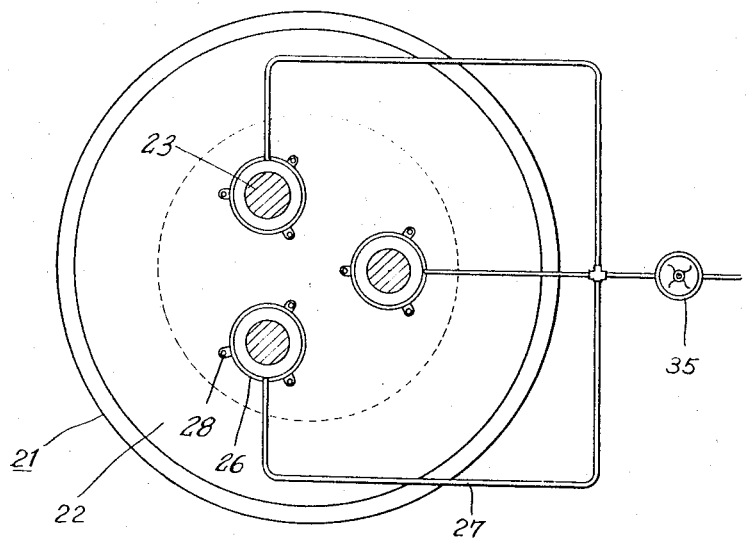
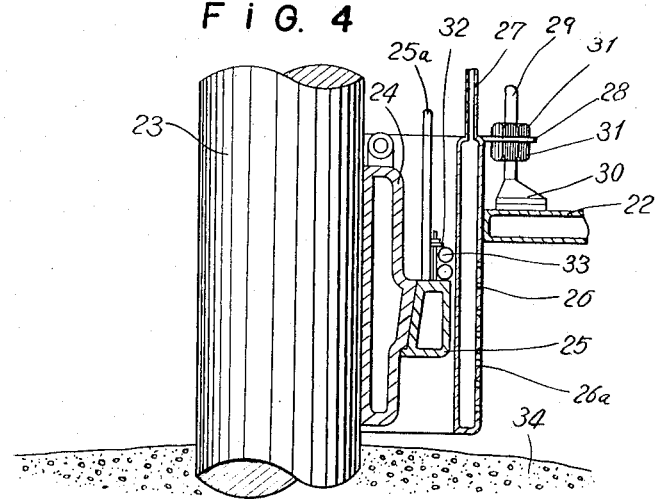

3,303,257
APPARATUS FOR UTILIZING WASTE HEAT OF GAS GENERATED FROM AN ELECTRIC SMELTING FURNACE
Yoshiyuki Fujiwara and Hachiro Fujiki, Tokyo, Chikato Ando and Zenjiro Nitta, Niigata-ken, and Toshio Miyake and Ken Shigenari, Kyoto-fu, Japan, assignors to Tanabe Kakoki Co., Ltd., Niigata-ken, Japan, and Awamura Mining Co., Ltd., Osaka-shi, Japan, both corporations of Japan
Filed Dec. 18, 1963, Ser. No. 331,515
Claims priority, application Japan, Feb. 6, 1963, 38/4,678; Feb. 8, 1963, 38/5,497; Mar. 29, 1963, 38/14,097; Aug. 24, 1963, 38/44,833, 38/44,834
4 Claims. (Cl. 13—9)

This invention relates to an improved method of and apparatus for effectively utilizing the heat of combustion and sensible heat of a gas evolved from an electric smelting furnace which is used to manufacture electric pig iron, ferroalloy, calcium carbide and the like by recovering said heat in said smelting furnace.

During operation of an electric furnace of the kind above referred to which is generally of the open type, gas evolved from the furnace and essentially consisting of CO gas burns naturally with flames on the surface of the raw material layer contained in the furnace. But only a small proportion of the heat of combustion generated at that time is utilized to heat the raw material and the major portion of the heat is exhausted into the surrounding air causing large loss of heat. While in some instances a portion of the burned gas is utilized to preheat or dry the raw material to utilize the sensible heat thereof, owing to large content of air contained in the burned gas it is quite difficult to utilize all of a large quantity of the heat of the combustion gas. Furthermore, in the open type furnace large quantity of heat is lost by radiation and convection to the surroundings causing poor operation.

For the purpose of obviating these defects of open type furnaces, electric smelting furnaces of enclosed type have been developed and are now widely used in commercial production. In the enclosed type, the upper surface of the furnace is hermetically closed by a cover or lid of heat resisting material and the gas generated in the furnace during smelting operation is exhausted to the outside of the furnace without burning it therein. The exhausted gas is then cooled and washed by water and stored in a gas holder for use as fuel gas for general purposes or as a raw material of chemical products. However, it is rare to use such exhaust gas as the raw material of chemical products because when $H_2$ for use in chemical industry is produced by conversion of CO gas its cost of production is higher than when it is produced by conventional method so that the exhaust gas is generally utilized as fuel. Even when it is used as fuel its field of application is limited because of relatively small heat of combustion of CO gas. Thus, at the present time the gas exhausted from said enclosed type smelting furnaces is not fully utilized and most of the recovered gas is generally exhausted in vain into the air.

With the enclosed type furnace, while the operating condition can be greatly improved there is the great hazard of explosion due to the mixing of the generated gas with air introduced in the furnace, thus requiring minute care not to introduce any air in the enclosed furnace. Leakage of the generated gas also causes danger of poison. Moreover, as the furnace is hermetically enclosed it is more difficult to maintain the condition of the layer of raw material contained in the furnace by poking than in the open type furnace. Accordingly, it is necessary to subject the raw material to expensive and troublesome treatments including drying, sizing, mixing and the like operations so as to prevent sintering, fusion or coagulation of the raw materials contained in the furnace.

It is an object of this invention to recover, as far as possible, in the furnace, the heat of combustion and sensible heat of gas consisting essentially of CO gas and produced in an electric smelting furnace of the enclosed type so as to save electric power, to fully utilize the enclosed type electric furnace while at the same time to obviate defects thereof.

A further object of this invention is to promote reducing action of oxides by CO gas during the reaction procedure in the furnace of a certain material to be smelted thereby to save the amount of reducing agent such as coke and the like.

A still further object of this invention is to provide a novel method of treating gas generated in the enclosed type electric smelting furnace wherein control of smelting operation or pretreating of the raw material can be effected more simply and safer than in the conventional open type furnace.

Another object of this invention is to provide a novel electric smelting furnace provided with associated means suitable to carry out the method of this invention.

While the specification concludes with claims particularly pointing out and distinctly claiming the subject matter which are regarded as this invention, it is believed that the invention will be better understood from the following description taken in connection with the accompanying drawings.

In the drawings:

FIG. 3 shows schematically a plan view of an electric furnace and illustrates a device for cooling the protective cylinders which surround electrode holders by utilizing incoming air for burning the evolved gas in accordance with the method of this invention;

FIG. 4 shows a sectional and partial elevational view of the electrode holder and protective cylinder shown in FIG. 3.

The present invention contemplates combining the merits both of the conventional open and enclosed type electric furnaces and succeeded in substantially decreasing electric power required per unit tonnage of the product to the extent that could not be attained by any of the two types of electric furnaces. More particularly this invention is characterized in that air enriched with oxygen is introduced from outside into the space above the layer of the raw material contained in the furnace so as to provide perfect combustion in the enclosed furnace of the gas evolved therein in the same manner as the open type furnace. In this case, like the open type furnace, there is no danger of explosion as the gas evolved in the furnace burns immediately by contact with the surpius air presenting above the layer of the raw material. Thus, the gas burns perfectly on the surface of the raw material and the heat of the flame is directly, or after being reflected by the inner wall of the furnace cover, utilized to heat the surface of the raw material, thus greatly elevating the temperature of the raw material fed into the furnace. In this manner, the amount of the electric power required for smelting furnace which is utilized to elevate the temperature of the raw material in the furnace to the reaction temperature can be greatly reduced.

In the enclosed type electric furnace of the conventional design, the gas evolved during the reaction undergoes heat exchange with the raw material during its upward flow through the layer of the raw material to give off sensible heat so that the temperature of the gas at the exit of the furnace is about from 300 to 500° C. The temperature of the surface of the raw material layer which is formed by piling up continuously fed raw material is about from 100 to 200° C. The surface temperature of the open type furnace is also relatively low, viz., about 300 to 400° C. Depending upon the type of smelting, the temperature of the reaction layer in the deeper portions of the furnace is about from 1300 to 2000° C. In any case there is substantial difference in temperatures between the surface layer portion and the deeper portion.

Heretofore, gas in the enclosed furnace was not burned but on the contrary those skilled in the art have endeavoured to avoid it. This is due to the fact that increase in the surface temperature of the raw material layer caused by the heat of combustion of evolved gas results in such difficulties as the sintering, fusion, coagulation as well as leakage of current between electrodes due to decrease in the electrical resistance of the surface layer, thus causing the operation unstable. As the result of our exhaustive research we have found that above mentioned difficulties do not occur even when the temperature of the charge is maintained in the furnace at such an elevated temperature as about 1000° C. during smelting. This invention is based on such fact.

Figure 1:
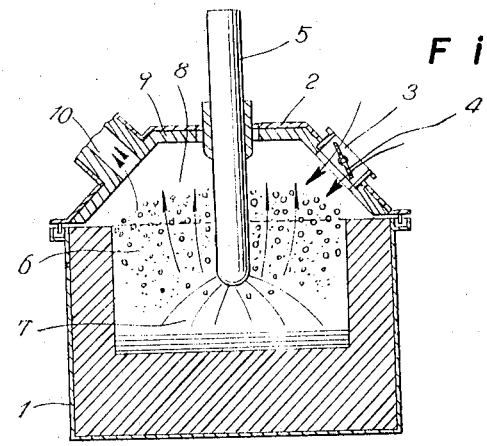
FIG. 1 shows a sectional elevational view of a basic enclosed type electric furnace used in carrying out this invention into practice.

There are two types of devices adapted to introduce air into the enclosed furnace for burning the evolved gas. The most basic method is to introduce air over the entire surface of the raw material layer through one or more openings which are provided for the furnace cover having adjustable dampers. An example of the device for accomplishing this is shown in FIG. 1. By this method while the majority of the evolved gas burns almost perfectly, as the contact between the gas and air is effected rather statically, the combusion is not perfect so that certain amount of CO gas may remain in the exhaust. The air introduced reaches all portions of the surface of the raw material layer so that a portion of the air may come into contact with the electrodes which have been heated to an elevated temperature by the electric current flowing therethrough to oxidize and wear the electrode carbon. Further, $CO_2$ gas which was produced by the combustion of the waste gas comes into contact with the high temperature electrode carbon to produce a carbon solution reaction and similarly wears the electrode carbon. Continued wear of the electrode carbon will ultimately result in the breakage of the electrodes, thus interrupting the operation of the furnace. It is desirable to surround the electrodes with a reducing gas in order to prevent such defects.

Figure 2:
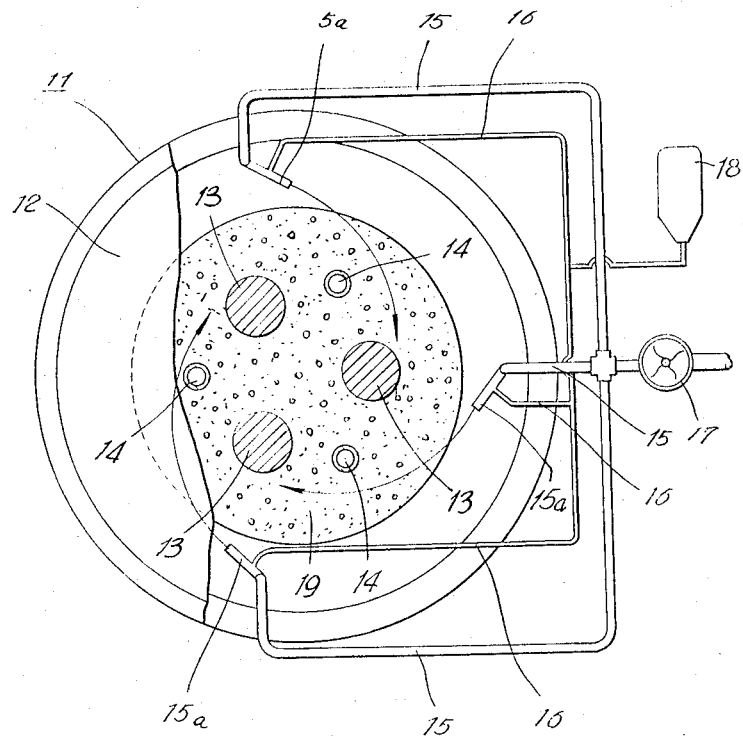
FIG. 2 shows schematically a plan view of a modified enclosed electric furnace used in carrying out this method.

We have succeeded in eliminating the above mentioned defects by introducing air along the inner peripheral wall of the furnace. Thus the air introduced will whirl along the inner peripheral wall of the furnace so that it will not reach the central portion of the furnace in which the electrodes are disposed. In this way, the high temperature portions of the electrodes are always surrounded by the waste gas thus preventing wear of the electrode carbon by oxydation. The generated gas will be diffused toward the inner peripheral wall by the action of the whirling motion of the air, to be mixed with the air to burn and the burned gas will be discharged out of the furnace through an exhaust pipe secured to the furnace lid at a suitable position. As the secondary effect of this arrangement the evolved gas will burn perfectly so that there is no appreciable CO gas in the exhaust gas. This is due to the fact that owing to constant flow of air introduced in the furnace the gas is thoroughly mixed with the air. As the tertiary effect, according to this invention, an auxiliary fluid fuel for adjusting the temperature inside the furnace can be easily injected into the furnace and burned. An example of carrying out this method is illustrated in FIG. 2.

We have also devised a remarkable method of introducing combustion air wherein the protective cylinder surrounding the respective electrode holders is cooled by the air introduced. Conventional enclosed type electric furnaces are inherently provided with such a protective cylinder and metal plates are usually employed because, in the conventional enclosed type furnace the temperature of the space within the furnace is generally below 300° C. as has been pointed out hereinabove. However, in the enclosed type furnace herein contemplated, the temperature within the furnace would rise to about 1000° C. or more, ordinary metals can not withstand such high temperatures. However, by constantly cooling the protective cylinder with the cold air which is introduced to support combustion of the evolved gas it becomes possible to utilize ordinary metal to fabricate the protective cylinder for carrying out this invention. One example of the device for this purpose is illustrated in FIGS. 3 and 4.

If this invention is applied to an enclosed electric furnace as shown in FIG. 1, due to the sensible heat of the burned gas and reflection of the radiated heat of the fire flame at the inner surface of the furnace lid the upper layer of the raw material will be maintained at a temperautre at about 1000° C. and the burned gas itself will be exhausted to the outside of the furnace at an elevated temperature of about 1000° C. If this burned gas is exhausted into the air through a chimney nearly all of the heat of the generated gas will be lost in vain and only a portion thereof will be utilized in the furnace. However it will be obvious that it is advantageous to more fully utilize the sensible heat of the burned gas at about 1000° C., for example by passing it through a conventional waste heat boiler, heat exchanger, drying apparatus and the like. However, in factories where electric furnaces constitute the major installation thereof, there is no way to utilize the heat of burned gas. Even when such factories are installed with means which can utilize the heat of the burned gas it is preferable to preheat the raw material which is to be fed into the electric furnaces so as to directly feed back the sensible heat to the inside of the furnaces. In prior enclosed electric furnace installation, it has been proposed to burn the evolved gas in a separate combustion chamber and to pass the combustion product thereof through a preheating apparatus. We have devised a novel preheating kiln of the raw material which can be directly coupled to the electric furnace. The detail of the preheating kiln will be given hereunder in connection with FIG. 5.

The type of apparatus which is suitable in carrying out this method will be considered in detail by referring to the accompanying drawing.

In FIG. 1 which illustrates the basic principle of this invention there is shown a conventional enclosed electric furnace having a lid provided with one or more holes each having a damper and adapted to introduce air into the electric furnace. The electric smelting furnace of the enclosed type shown comprises a furnace body 1 lined with a suitable heat insulating material such as fire bricks, insulating bricks and the like, a lid 2 and a plurality of electrodes 5 (only one is shown) which are mounted through the lid to be movable in the vertical direction. The tip of the electrode extends to the direct reducing zone 7 situated at the deepest portion of the furnace through the indirect reducing zone at the upper portion of the raw material layer which is formed by the raw material fed into the furnace through an appropriate charging port, not shown in the drawing. Gas evolved from the reaction zone and essentially consisting of CO gas is accumulated in a space 8 above the charge and then led to the outside of the furnace through an exhaust opening 10. According to this invention, there is provided an opening or passage 3 through the lid 2 of a conventional enclosed electric furnace, said opening being lined with a suitable refractory material and provided with an adjustable damper 4. Although not shown in the drawing it will be understood that the exhaust opening 10 is to be connected to a chimney or a suitable waste heat utilization apparatus outside of the furnace and having a suitable suction blower. Thus by natural or artificial draft, the pressure in the space 8 in the furnace will be reduced to some extent to draw the air through the opening 3 to burn the waste gas. As stated hereinbefore, the temperature of the raw material contained in the furnace will be elevated and it is advantageous to control the operation to maintain the surface temperature of the raw material layer at about 1000° C. by adjusting the the damper 4 or introducing oxygen gas or auxiliary fuel. Thus the temperature of the exhaust gas through the exhaust port 10 will be maintained at about 1000° C.

FIG. 2 shows a modification of this invention wherein means for introducing the combustion air into the furnace is modified to increase the efficiency. Like conventional enclosed electric furnaces three electrodes 13 mounted on the lid 12 of a furnace body 11 extend into the layer of the charged raw material 19 and three blowing nozzles 15a are provided for the lid 12 in tangential directions with respect to the peripheral inner wall of the furnace. Each of the blowing nozzles 15a is connected to an air blower 17 through an air supply tube 15. The air injected from these blowing pipes 15a will attract the waste gas towards the peripheral portion of the furnace so that the space directly surrounding the electrodes 13 will be always occupied by waste gas essentially consisting of CO gas. Thus oxidation and wear of the electrode carbon due to air or $CO_2$ can be prevented. Also combustion of the evolved gas is promoted by vigorous circulating motion of the gas within the furnace due to tangential injection of combustion air, so that there will be no CO content in the burned gas. The burned gas is exhausted through three exhaust pipes 14 to the atmosphere or to a suitable treating device, not shown.

If desired, the nozzle 15a are connected to an oil tank 18 through oil pipes 16 so as to inject a mixture of air and fuel oil to assist combustion. Or a suitable oxygen enriching apparatus may be provided. Since the air is fed by a powerful blower 17, it is able to maintain the pressure in the furnace above the atmospheric pressure. Furthermore leakage of gas from the furnace causes no damage because CO gas therein has been perfectly burned. It will be understood that the number of nozzles 15a is not limited to three but any suitable number can be selected.

In a further modification shown in FIGS. 3 and 4 the method of introducing combustion air is improved to solve the problem involved in the material for the protective cylinder of the electrode and also to prevent wear of electrode carbon and to promote combustion. Generally, in enclosed type electric furnaces having electrode holders extending downwardly from the furnace lid, it is usual to secure protective cylinders to the lids around the electrode holders in order to protect guide means above and below the electrodes, gas-tight packings around the electrode holder and the electrode holders themselves. Considering the conventional construction by referring to the drawing there are shown in FIGS. 3 and 4 three electrodes 23 which are extending through a lid 22 covering a furnace body 21 into the layer 34 of the charged raw material. Around each of the electrodes 23 there is provided an electrode holder 24 which is split into several sections and designed to circulate cooling water. Also around the electrode holder is a cotter ring 25 designed to pass cooling water therethrough so that by mechanically lifting the hanging rod 25a connected to the cotter ring 25, the electrode holder is made to clamp the associated electrode, thus hanging the electrode in the furnace. As the lower end of the electrode carbon wears with the progress of smelting operation, then the holder is loosened to properly lower the carbon electrode. According to the conventional design, a protective cylinder 26 made of a single solid metal plate is positioned to surround the electrode holder, said protective cylinder being secured to the electrode opening of the furnace lid 22 at a suitable level by means of a flange 28 secured to the protective cylinder 26. A screw rod 29 extends through flange 28, a seat 30 is secured on the lid 22 to support the screw rod and two nuts 31 cooperating therewith. A packing 33 contained in a stuffing box secured to the upper surface of the cotter ring 25 slides along the inner wall of the protective cylinder to prevent furnace gas from leaking into the surrounding atmosphere through the electrode mounting.

In accordance with this invention protective cylinder 26 is of the air jacket type. Thus, the cooling air is introduced into the hollow protective cylinder through an air inlet pipe secured to the upper portion thereof by means of a powerful blower 35, FIG. 3, and then the air is directed to the inner wall of the furnace through a number of small perforations provided at the outer lower surface of the protective cylinder.

Although not shown in the drawing, if desired, suitable means may be provided to introduce a suitable fuel oil through the pipe 27 and then eject it through the perforations to provide auxiliary combustion. Since the protective cylinder 26 is constantly cooled by the air flowing therethrough, it may be made with common material although the temperature within the furnace is high, say about 1000° C. Moreover, as the air is ejected into the furnace after being warmed in the protective cylinder, it can promote and perfect the combustion of the evolved gas aided by its flow movement. Due to the position of the protective cylinder the air and burned gas have no opportunity to enter into the central region of the furnace so that wear of electrode carbon due to oxidation does not occur.

Now, a preheating kiln directly coupled to the furnace to preheat the raw material by utilizing the high temperature burned gas formed in accordance with this invention will be described. The conventional shaft kiln type preheater is inconvenient to be installed directly on the furnace because of its length. Such a conventional preheater is also disadvantageous in that it requires a powerful suction gas blower due to its large resistance to gas flow and that it disturbs uniform falling of the raw material due to segregation of the raw material particles in the kiln, sintering and hanging caused by non-uniform distribution of resistance to the flow of gas. Further it is usually necessary to install a dust collector or dust washer in front of gas blower owing to a large amount of dust contained in the waste gas coming from the preheater kiln.

Figure 5:
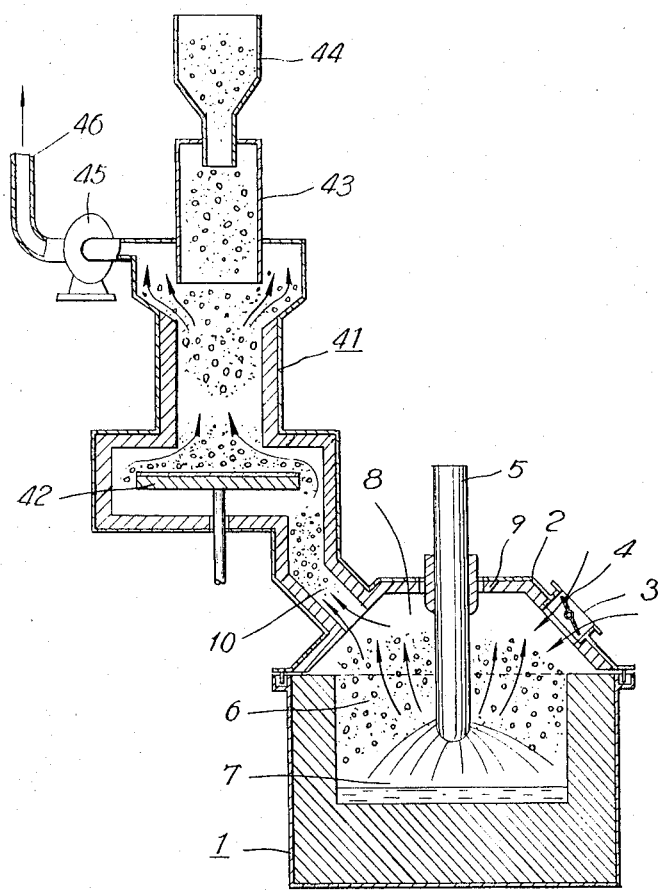
FIG. 5 is a sectional elevational view of a novel raw material preheating device directly coupled to the enclosed electric furnace shown in FIG. 1.

We have provided a novel preheating shaft kiln for raw materials adapted to be used in the smelting furnace herein described in order to eliminate the above mentioned trouble. FIG. 5 illustrates one example of such an improved kiln, wherein the same reference numerals designate the same or corresponding parts of the furnace shown in FIG. 1. The preheating kiln 41 directly coupled to the exhaust port 10 of the furnace has a bottom of large cross section containing a table feeder 42. The effective height of the shaft kiln constructed in accordance with this invention is much lower than that of the conventional design and it was found by experiments that the effective height may be less than three times the inner diameter of the main body of the kiln 41. The upper portion of the main body 41 is also flared outwardly into which is inserted a raw material tank 43 provided with a hopper 44. The waste gas which has undergone heat exchange with the raw material is discharged from the upper space in the main body of the kiln 41 and thence to the surrounding air through a chimney 46 by the action of a suction blower 45.

Inasmuch as this preheating shaft kiln has lower height and larger diameter than the conventional kiln its internal resistance to gas flow is small so that a blower of small power rating may be used and the amount of dust discharged into the air can be minimized without using any gas purifying apparatus, such as a dust collector or a gas washer. Since heat exchange is effected uniformly at all portions of the kiln its efficiency is high and the raw material can descend smoothly without any partial sintering or hanging. If the preheating kiln is directly coupled to the enclosed electric furnace shown in FIG. 1 or 4 it is possible to easily raise the temperature at the surface layer of the raw material to a temperature of about 1000° C. without using auxiliary fuel, and the temperature of the exhaust gas issuing from the kiln can be reduced to about 50° C.

Summarizing the above, in accordance with the novel method and apparatus of this invention, clean and comfortable operation may be carried out as in the conventional enclosed electric furnaces, and also simple operation and control is possible as in the conventional open electric furnaces.

Moreover the erection cost of the factory is cheaper than prior enclosed types. Further, as the electric power necessary for unit tonnage of the product can be greatly reduced, the production cost can be also greatly decreased.

Further, in accordance with this invention, required electric power may not only be reduced, but the amount of a reducing agent required may also be saved depending upon the type of smelting. For instance, where high carbon ferro-manganese is to be produced with the electric furnace, the composition of the gas evolved from the layer of raw material, according to the conventional open or enclosed type electric furnace, is about 70 to 75% of CO and about 25 to 30% of $CO_2$, whereas with the method and apparatus of this invention said composition is approximately 50% of CO and 50% of $CO_2$. It is considered that this is due to the results that $MnO_2$ is dissolved and sets oxygen free, and said $O_2$ is combined with CO and formed into $CO_2$. Consequently, the reducing coke required for reducing $MnO_2$ to Mn can be saved.

Furthermore, in the conventional method of preparing calcium carbide, quick lime is produced in a lime kiln by using limestone and the product is sorted to obtain raw material. Whereas since in accordance with this invention the temperature of the raw material fed into the furnace from the preheating kiln and the surface temperature of the charged raw material layer are elevated to about 1000° C. it becomes possible to directly use limestone as the raw material instead of utilizing such expensive quick lime.

The following are examples of smelting operation embodying the method and apparatus of this invention. For comparison, high carbon ferro-manganese containing 77% of Mn was prepared by utilizing a conventional electric furnace and an improved enclosed type electric furnace as shown in FIG. 1, but without preheating the raw material, the capacity of both of these furnaces being 1500 kva.

Example 1

The manganese ore used was a mixture of raw ore of India origin and sintered ore of Australia origin which were mixed in the ratio of 6:4, and the mean composition of the ore was 46% of Mn, 7.5% of Fe, 13% of $SiO_2$, 5% of $Al_2O_3$, 1% of MgO, 0.16% of P and 2.5% of combined water. Composition of coke breeze utilized as the reducing agent was 88% of fixed carbon, 2% of volatile matter and 10% of ash. The composition of limestone utilized to adjust the basicity of the slag was 54.8% of CaO, 1.6% of $SiO_2$ and 0.004% of P. The particle size of the respective raw material was as shown in the table below.

| | Raw ore | Sintered ore | Limestone | Coke breeze |
|---|---|---|---|---|
| Above 10 mm., percent | 84.2 | 65.1 | 63.7 | 0.2 |
| Below 10 mm., percent | 15.8 | 34.9 | 36.3 | 99.8 |

About 350 kg. of the mixture of these raw materials was charged in a conventional open type electric furnace at every 30 minutes and smelted by an input of 1000 kw. to produce ferro-manganese product containing 77.5% of Mn, 0.5% of Si, 6.8% of C, 0.2% of P and 0.01% of S. The basicity of the slag was 1.2, content of Mn of slag was 14.0% and the yield of Mn in the product was 84.2%. Required amount of the raw material per 1000 kg. of the product was 2000 kg. of manganese ore, 420 kg. of coke breeze, 580 kg. of limestone, 18 kg. of electrode carbon and electric power of 3360 kwh.

A similar product was obtained by closing the electric furnace as shown in FIG. 1, introducing the air into the furnace through the opening in the lid under the action of natural draft, burning the evolved gas in the furnace and by using similar raw materials and operations as above described. In this case since the raw materials are not preheated it was impossible to maintain the temperature to about 1000° C. the surface temperature of the raw material layer charged in the furnace. Therefore, an oil burner was attached to the lid of the furnace so as to burn fuel oil at a rate of 0.2 liter per minute. Burned gas issuing from the furnace contained only 0.6% of CO gas. Necessary amount of coke breeze per 1000 kg. of the product was 380 kg., amounts of other raw materials being the same as in the previous case. The required electric power was greatly decreased to 2480 kwh. which is to be compared with that required by the open type electric furnace. While this method requires consumption of about 30 liters of fuel oil per 1000 kg. of the product, this additional cost is cancelled by saving the required electric power. Moreover operating conditions were greatly improved.

Example 2

A preheating kiln having an internal diameter of 0.8 m. and an effective height of 0.9 m. was directly mounted on a 1500 kva. enclosed electric furnace which is provided with protective cylinders as shown in FIGS. 3 and 4 to prepare similar ferro-manganese by using the same raw materials and operating conditions as in Example 1. In this case, since the raw material fed into the electric furnace had been preheated to about 1000° C., it was not necessary to use auxiliary combustion of fuel oil in order to maintain the surface temperature of the charged raw material layer at about 1000° C. The quantity of air fed into the furnace was 8 m.³/m. and the temperature of the waste gas issuing from the preheater was only 50° C. It was found that the composition of the waste gas was 37.5% of $CO_2$, 5% of $O_2$ and 57.5% of $N_2$ and the presence of CO was not noted. The required electric power in this example was 2100 kwh. per 1000 kg. of the product, a reduction of about 40% when compared with the open type electric furnace. The required quantity of coke breeze per 1000 kg. of the product was 370 kg., the required quantities of other raw materials being the same as in the case of the open type electric furnace. The required amount of the reducing agent amounted to 88% of that required in the conventional method.

In accordance with the provisions of the patent statutes we have explained the principle and operation of our invention and have illustrated and described what we consider to represent the best embodiment thereof. However, we desire to have it understood that within the scope of the appended claims, the invention may be practiced otherwise than as specifically illustrated and described.

What is claimed is:

1. In an electric furnace for converting a raw manganese ore into a ferro-manganese product, as well as to produce ferrosilicon ferrochrom, pig iron, carbide and other ferro materials, with an inner wall at least partly cylindrical, including a lid and elongated cylindrical electrodes for heating the raw ore into slag, the improvement therein comprising, > an electrode holder below said lid for holding said electrode, split into several radial hollow sections for circulating cooling water around the electrode;
> a hollow protective cylinder around said electrode holder and electrode, said hollow protective cylinder extending from above the lid to below the lid, with means above said lid through which air is fed, which air is then directed to the inner wall of the furnace through a number of small perforations at the lower end of said protective cylinder; and,
> a ring below said lid including a hollow passage for passing cooling fluid around said electrode with a hanging rod connected to said ring from above said lid to clamp the ring to the electrode and adjust its relative position in the slag.

2. In an enclosed electric resistance furnace having electrode holders and protecting cylinders of air jacket type surrounding said electrode holders, the improvement therein comprising hollow protective cylinders around said electrode holders, said hollow protective cylinder extending from above a lid of the furnace to below the lid, with means above said lid through which an oxygenous gas is fed in, which is then directed to the inner wall of the furnace through a number of small perforations at the lower end of said protective cylinders.

3. In an electric furnace as claimed in claim 2, including a pipe above said lid connected to said hollow protective cylinder through which air and fuel oil may be introduced, said fuel oil serving for auxiliary combustion.

4. In an electric furnace as claimed in claim 3 including a blower connected to said pipe above the lid.

References Cited by the Examiner
UNITED STATES PATENTS

| | | | |
|---|---|---|---|
| 2,154,737 | 4/1939 | Erdmann | 13—9 |
| 2,752,410 | 6/1956 | Olsson | 13—9 |
| 2,927,142 | 3/1960 | La Bate | 13—9 X |

JOSEPH V. TRUHE, *Primary Examiner.*